(12) United States Patent
Yoshida et al.

(10) Patent No.: US 9,523,016 B2
(45) Date of Patent: Dec. 20, 2016

(54) AQUEOUS DISPERSION AND METHOD FOR PRODUCING SAME

(75) Inventors: Shumi Yoshida, Settsu (JP); Katsuhiko Imoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 198 days.

(21) Appl. No.: 14/347,516

(22) PCT Filed: Sep. 14, 2012

(86) PCT No.: PCT/JP2012/073721
§ 371 (c)(1),
(2), (4) Date: Mar. 26, 2014

(87) PCT Pub. No.: WO2013/047249
PCT Pub. Date: Apr. 4, 2013

(65) Prior Publication Data
US 2014/0221556 A1    Aug. 7, 2014

(30) Foreign Application Priority Data

Sep. 27, 2011    (JP) .................................. 2011-211431

(51) Int. Cl.
| | | |
|---|---|---|
| *C09D 127/16* | (2006.01) | |
| *C08L 27/16* | (2006.01) | |
| *C08F 259/08* | (2006.01) | |
| *C09D 133/02* | (2006.01) | |
| *C08F 14/22* | (2006.01) | |
| *C08F 2/22* | (2006.01) | |
| *C09D 133/16* | (2006.01) | |
| *C08F 214/22* | (2006.01) | |
| *C08F 220/06* | (2006.01) | |
| *C08F 220/18* | (2006.01) | |

(52) U.S. Cl.
CPC ............. *C09D 127/16* (2013.01); *C08F 2/22* (2013.01); *C08F 14/22* (2013.01); *C08F 214/222* (2013.01); *C08F 259/08* (2013.01); *C08L 27/16* (2013.01); *C09D 133/02* (2013.01); *C09D 133/16* (2013.01); *C08F 220/06* (2013.01); *C08F 220/18* (2013.01)

(58) Field of Classification Search
CPC ................................ C09D 127/16; C08L 27/16
USPC ............................................................. 524/520
See application file for complete search history.

(56) References Cited

U.S. PATENT DOCUMENTS

| | | | |
|---|---|---|---|
| 6,207,236 B1 | 3/2001 | Araki et al. | |
| 2010/0110609 A1* | 5/2010 | Koh .......................... | C08J 5/18 361/323 |
| 2010/0222494 A1 | 9/2010 | Imoto et al. | |
| 2012/0004367 A1 | 1/2012 | Imoto et al. | |

FOREIGN PATENT DOCUMENTS

| | | | | |
|---|---|---|---|---|
| CN | 1222178 A | 7/1999 | | |
| CN | 101238153 A | 8/2008 | | |
| EP | 0 360 575 A2 | 3/1990 | | |
| EP | 1 026 201 A1 | 8/2000 | | |
| EP | 1 160 298 A1 | 12/2001 | | |
| JP | 5-271358 A | 10/1993 | | |
| JP | 5-271359 A | 10/1993 | | |
| JP | 8-259773 A | 10/1996 | | |
| JP | EP 1026201 A1 * | 8/2000 | ............... | C08F 8/42 |
| JP | 2009-123523 A | 6/2009 | | |
| WO | 2010/104142 A1 | 9/2010 | | |

OTHER PUBLICATIONS

International Preliminary Report on Patentability for PCT/JP2012/073721 issued Apr. 1, 2014.
International Search Report for PCT/JP2012/073721 dated Nov. 27, 2012.
Extended European Search Report dated Apr. 16, 2015, issued by the European Patent Office in counterpart European application No. 12835110.3.

* cited by examiner

*Primary Examiner* — Bijan Ahvazi
*Assistant Examiner* — Ronald Grinsted
(74) *Attorney, Agent, or Firm* — Sughrue Mion, PLLC

(57) ABSTRACT

The present invention aims to provide an aqueous dispersion capable of forming a coating film that has excellent adhesion to a substrate and excellent water resistance. The aqueous dispersion of the present invention includes fluorine-containing composite polymer particles of a polymer (A) with a repeating unit of vinylidene fluoride and a polymer (B) with a repeating unit of at least one acrylic monomer selected from the group consisting of acrylic acid, acrylic acid esters, methacrylic acid, and methacrylic acid esters, the dispersion having an acid value of at least 3 mgKOH/g.

8 Claims, No Drawings

AQUEOUS DISPERSION AND METHOD FOR PRODUCING SAME

CROSS REFERENCE TO RELATED APPLICATIONS

This application is a National Stage of International Application No. PCT/JP2012/073721, filed on Sep. 14, 2012, which claims priority from Japanese Patent Application No. 2011-211431, filed on Sep. 27, 2011, the contents of all of which are incorporated herein by reference in their entirety.

TECHNICAL FIELD

The present invention relates to an aqueous dispersion and a method for producing the same.

BACKGROUND ART

For coating materials for various structures, fluorine coating materials having excellent water resistance and weather resistance have been used up until now. Fluorine coating materials, however, have a disadvantage that they have insufficient adhesion to a substrate and insufficient water resistance.

Patent Literature 1 teaches a water-based fluoropolymer dispersion obtained by emulsion-polymerizing a monomer mixture containing an acrylic acid alkyl ester and/or a methacrylic acid alkyl ester, and an ethylenically unsaturated monomer copolymerizable with these esters, in an aqueous medium. Patent Literature 1 also teaches that the adhesion can be significantly improved when the ethylenically unsaturated monomer is a monomer containing a cyclohexyl group.

Patent Literature 2 teaches an aqueous coating composition obtained by a production method including (1) a step for preparing an aqueous dispersion of fluorine-containing polymer particles by polymerization of monomers comprising at least one fluoroolefin in an aqueous dispersion in the presence of a surfactant, and (2) a step for seed-polymerizing an ethylenically unsaturated monomer with fluorine-containing polymer particles in the aqueous dispersion of fluorine-containing polymer particles. Also, Patent Literature 2 teaches that use of a compound represented by $CH_2$—$CHCH_2$—O—R (wherein R is a hydrocarbon group which may have an oxygen atom, a nitrogen atom and/or a polar group) as the surfactant used in the step (1) improves the adhesion to a substrate, foamability, and gloss.

As described above, technologies for improving the adhesion have been developed, but further improvement in the adhesion and water resistance is desired.

CITATION LIST

Patent Literature

Patent Literature 1: JP H08-259773 A
Patent Literature 2: WO 2010/104142

SUMMARY OF INVENTION

Technical Problem

In view of the current state of the art described above, the present invention aims to provide an aqueous dispersion capable of forming a coating film with excellent adhesion to a substrate and excellent water resistance.

Solution to Problem

As described above, the conventional technology improves the adhesion between a coating film and a substrate and water resistance by optimizing the kinds and combination of monomers constituting a polymer in a fluorine coating material. The present inventors, however, have made intensive studies on the solution for the above problem, and have found that the acid value of the aqueous dispersion greatly affects the adhesion between the coating film and the substrate and water resistance, thereby completing the present invention.

One aspect of the present invention is an aqueous dispersion containing fluorine-containing composite polymer particles of a polymer (A) with a repeating unit of vinylidene fluoride and a polymer (B) with a repeating unit of at least one acrylic monomer selected from the group consisting of acrylic acid, acrylic acid esters, methacrylic acid, and methacrylic acid esters, the dispersion having an acid value of at least 3 mgKOH/g.

The polymer (B) preferably contains a repeating unit of a methacrylic acid ester, and a repeating unit of at least one acrylic monomer selected from the group consisting of acrylic acid and acrylic acid esters.

The polymer (A) preferably further contains a repeating unit of at least one fluoroolefin selected from the group consisting of tetrafluoroethylene units, hexafluoropropylene units, and chlorotrifluoroethylene units.

The aqueous dispersion preferably contains the fluorine-containing composite polymer particles in an amount of 20 to 65% by mass.

The fluorine-containing composite polymer particles preferably have an average particle size of 50 to 300 nm.

The aqueous dispersion preferably further contains an inorganic silicon compound.

Another aspect of the present invention is an aqueous coating composition containing the above aqueous dispersion.

Yet another aspect of the present invention is a method for producing the above aqueous dispersion. The production method includes the steps of: adding an acrylic monomer and a polymerization initiator to an aqueous dispersion that contains particles of a polymer (A) with a repeating unit of vinylidene fluoride; and polymerizing the acrylic monomer to produce an aqueous dispersion containing fluorine-containing composite polymer particles of the polymer (A) with a repeating unit of vinylidene fluoride and a polymer (B) with a repeating unit of the acrylic monomer.

Advantageous Effects of Invention

Since the aqueous dispersion of the present invention has the above structure, the dispersion can form a coating film with excellent adhesion when applied to a substrate. The resulting coating film also has excellent water resistance. Since the production method of the present invention has the above steps, the method can produce an aqueous dispersion capable of forming a coating film with excellent adhesion and excellent water resistance.

DESCRIPTION OF EMBODIMENTS

Hereinafter, the present invention is specifically described.

The aqueous dispersion of the present invention has a feature that it has an acid value of at least 3 mgKOH/g. The acid value is preferably at least 4 mgKOH/g, more preferably at least 9 mgKOH/g, and still more preferably at least 12 mgKOH/g. The upper limit of the acid value is preferably 18 mgKOH/g.

The aqueous dispersion of the present invention contains fluorine-containing composite polymer particles of the polymer (A) and the polymer (B). The polymer (A) and the polymer (B) are present in a single particle. In this respect, the aqueous dispersion with fluorine-containing composite polymer particles of the present invention is different from an aqueous dispersion formed by simply mixing the polymer (A) and the polymer (B). The polymer (A) and the polymer (B) are not chemically bonded.

The polymer (A) contains a repeating unit of vinylidene fluoride. The polymer (A) preferably contains the repeating unit of vinylidene fluoride in an amount of 20 to 95 mol %, and more preferably 65 to 35 mol %, of the whole monomer units constituting the polymer (A).

The polymer (A) containing the repeating unit of vinylidene fluoride (VDF) preferably further contains a repeating unit of at least one fluoroolefin selected from the group consisting of a tetrafluoroethylene (TFE) unit, a hexafluoropropylene (HFP) unit, and a chlorotrifluoroethylene (CTFE) unit, and more preferably a repeating unit of TFE and CTFE, a repeating unit of TFE, or a repeating unit of HFP.

Examples of the polymer (A) include a VDF/TFE copolymer, a VDF/TFE/CTFE copolymer, a VDF/HFP copolymer, a VDF/TFE/HFP copolymer, and a VDF/CTFE copolymer.

The polymer (A) may contain a repeating unit of a fluoroolefin other than the above fluoroolefins, including perfluoroolefins such as perfluoro(alkyl vinyl ether) and compounds represented by

[Chem. 1]

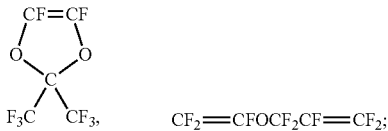     $CF_2$=$CFOCF_2CF$=$CF_2$;

and non-perfluoroolefins such as vinyl fluoride, trifluoroethylene, trifluoropropylene, pentafluoropropylene, tetrafluoropropylene, hexafluoroisobutene, 2,3,3,3-tetrafluoropropene, 1,3,3,3-tetrafluoropropene, and 1,1,3,3,3-pentafluoropropene. Examples of the perfluoro(alkyl vinyl ether) include perfluoro(methyl vinyl ether) (PMVE), perfluoro(ethyl vinyl ether) (PEVE), and perfluoro(propyl vinyl ether) (PPVE).

The polymer (A) may contain a repeating unit of a functional group-containing fluoroolefin. Examples of the functional group-containing fluoroolefin include compounds represented by formula (1):

$$CX^1_2 = CX^2 - (Rf)_m - Y^1 \quad (1)$$

wherein $Y^1$ is —OH, —COOM$^2$, —SO$_2$F, —SO$_3$M$^2$ (M$^2$ is a hydrogen atom, an NH$_4$ group, or an alkali metal), an alkoxycarbonyl group, an epoxy group, or a cyano group; $X^1$ and $X^2$ are the same as or different from each other, each representing a hydrogen atom or a fluorine atom; Rf is a C1-C40 divalent fluorine-containing alkylene group, a C1-C40 fluorine-containing oxyalkylene group, or a divalent fluorine-containing alkylene group having a C2-C40 ether bond; and m is 0 or 1.

Specifically, for example, compounds represented by

[Chem. 2]

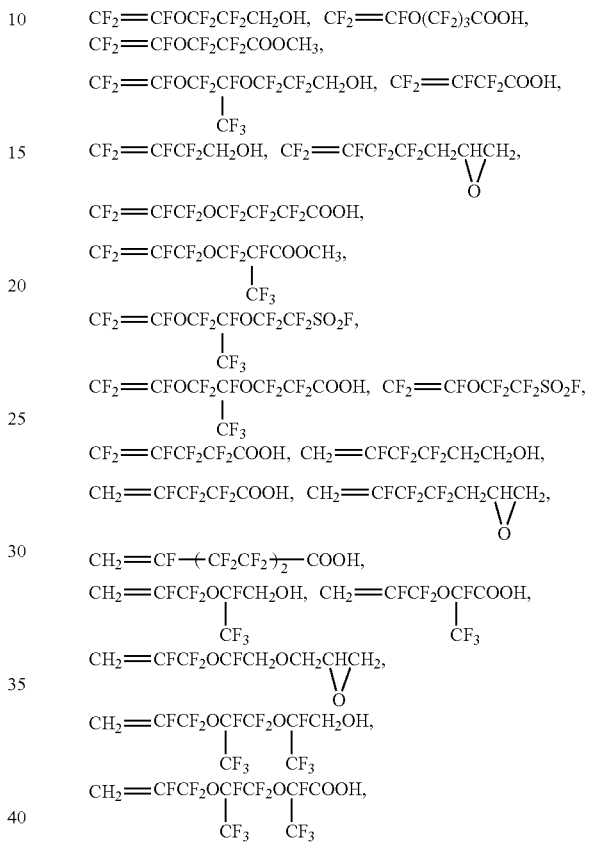

[Chem. 3]

$CH_2$=$CHCF_2CF_2CH_2CH_2COOH$,
$CH_2$=$CH$$(CF_2)_4$$CH_2CH_2CH_2OH$,
$CH_2$=$CH$$(CF_2)_6$$CH_2CH_2COOCH_3$,

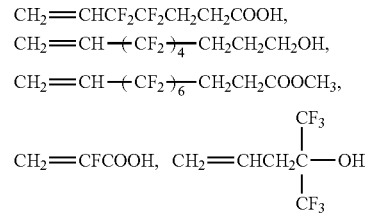

can be mentioned.

The polymer (A) may contain a repeating unit of an iodine-containing monomer. The iodine-containing monomer can be, for example, an iodide such as perfluoro(6,6-dihydro-6-iodo-3-oxa-1-hexene) described in JP H05-63482 B and JP S62-12734 A or perfluoro(5-iodo-3-oxa-1-pentene).

The polymer (A) may contain a repeating unit of a non-fluorinated olefin copolymerizable with a fluoroolefin.

The fluorine content of the polymer (A) is preferably 50 to 76% by mass, and more preferably 60 to 70% by mass.

The production method of the polymer (A) is not particularly limited, and may be conventionally known emulsion polymerization.

The polymer (B) contains a repeating unit of at least one acrylic monomer selected from the group consisting of acrylic acid, acrylic acid esters, methacrylic acid, and methacrylic acid esters.

The acrylic acid ester is preferably an acrylic acid alkyl ester with a C1-10 alkyl group. Especially in terms of provision of a coating film with excellent transparency, the film formability, and transparency the acrylic acid ester is preferably at least one acrylic acid alkyl ester selected from the group consisting of methyl acrylate, ethyl acrylate, n-propyl acrylate, isopropyl acrylate, n-butyl acrylate, 2-ethyl hexyl acrylate, cyclohexyl acrylate, and glycidyl acrylate, and more preferably at least one acrylic acid alkyl ester selected from the group consisting of n-butyl acrylate and 2-ethyl hexyl acrylate. The above acrylic acid ester does not contain a hydrolyzable silyl group.

The methacrylic acid ester is preferably a methacrylic acid alkyl ester having a C1-C10 alkyl group. Especially in terms of provision of a coating film having excellent transparency, film formability, and transparency the methacrylic acid ester is more preferably at least one methacrylic acid alkyl ester selected from the group consisting of methyl methacrylate, n-propyl methacrylate, ethyl methacrylate, n-butyl methacrylate, isopropyl methacrylate, 2-ethylhexyl methacrylate, cyclohexyl acrylate, cyclohexyl methacrylate, and glycidyl methacrylate, and still more preferably at least one methacrylic acid alkyl ester selected from the group consisting of methyl methacrylate and cyclohexyl methacrylate. The above methacrylic acid ester does not contain a hydrolyzable silyl group.

The polymer (B) preferably contains a repeating unit of a methacrylic acid ester and a repeating unit of at least one acrylic monomer selected from the group consisting of acrylic acid and acrylic acid esters in terms of forming a coating film having excellent adhesion and excellent water resistance. The polymer (B) more preferably contains a repeating unit of a methacrylic acid ester, a repeating unit of acrylic acid, and a repeating unit of an acrylic acid ester in terms of easiness in controlling the acid value and of forming a coating film having even better adhesion and even better water resistance.

The polymer (B) more preferably contains 5 to 90% by mass of a repeating unit of a methacrylic acid ester, 1 to 10% by mass of a repeating unit of acrylic acid, and 5 to 90% by mass of a repeating unit of an acrylic acid ester.

The polymer (B) may contain a repeating unit of a hydrolyzable silyl group-containing monomer. Examples of the hydrolyzable silyl group-containing monomer include $CH_2=CHSi(OCH_3)_3$,
$CH_2=CHSi(CH_3)(OCH_3)_2$,
$CH_2=C(CH_3)Si(OCH_3)_3$,
$CH_2=C(CH_3)Si(CH_3)(OCH_3)_2$,
$CH_2=CHSi(OC_2H_5)_3$,
$CH_2=CHSi(OC_3H_7)_3$,
$CH_2=CHSi(OC_4H_9)_3$,
$CH_2=CHSi(OC_6H_{13})_3$,
$CH_2=CHSi(OC_8H_{17})_3$,
$CH_2=CHSi(OC_{10}H_{21})_3$,
$CH_2=CHSi(OC_{12}H_{25})_3$,
$CH_2=CHCOO(CH_2)_3Si(OCH_3)_3$,
$CH_2=CHCOO(CH_2)_3Si(CH_3)(OCH_3)_2$,
$CH_2=CHCOO(CH_2)_3Si(OC_2H_5)_3$,
$CH_2=CHCOO(CH_2)_3Si(CH_3)(OC_2H_5)_2$,
$CH_2=C(CH_3)COO(CH_2)_3Si(OCH_3)_3$,
$CH_2=C(CH_3)COO(CH_2)_3Si(CH_3)(OCH_3)_2$,
$CH_2=C(CH_3)COO(CH_2)_3Si(OC_2H_5)_3$,
$CH_2=C(CH_3)COO(CH_2)_3Si(CH_3)(OC_2H_5)_2$,
$CH_2=C(CH_3)COO(CH_2)_2O(CH_2)_3Si(OCH_3)_3$,
$CH_2=C(CH_3)COO(CH_2)_2(CH_2)_3Si(CH_3)(OCH_3)_2$,
$CH_2=C(CH_3)COO(CH_2)_{11}Si(OCH_3)_3$,
$CH_2=C(CH_3)COO(CH_2)_{11}Si(CH_3)(OCH_3)_2$,
$CH_2=CHCH_2OCO(o-C_6H_4)COO(CH_2)_3Si(OCH_3)_3$,
$CH_2=CHCH_2OCO(o-C_6H_4)COO(CH_2)_3Si(CH_3)(OCH_3)_2$,
$CH_2=CH(CH_2)_4Si(OCH_3)_3$,
$CH_2=CH(CH_2)_3Si(OCH_3)_3$,
$CH_2=CHO(CH_2)_3Si(OCH_3)_3$,
$CH_2=CHCH_2O(CH_2)_3Si(OCH_3)_3$, and
$CH_2=CHCH_2OCO(CH_2)_{10}Si(OCH_3)_3$.

These hydrolyzable silyl group-containing monomers may be used alone or in combination.

In terms of favorable adhesion and favorable storage stability, at least one selected from the group consisting of γ-methacryloxypropyltrimethoxysilane, γ-methacryloxypropylmethyldimethoxysilane, γ-methacryloxypropyltriethoxysilane, and γ-methacryloxypropylmethyldiethoxysilane is preferred.

The amount of the repeating unit of a hydrolyzable silyl group-containing monomer is preferably 0.1 to 2% by mass of the repeating unit of the acrylic monomer. An amount of less than 0.1% by mass may lead to insufficient adhesion, while an amount of more than 2% by mass may lead to unstable film formability and storage stability. The upper limit thereof is more preferably 1.5% by mass. The lower limit thereof is more preferably 0.2% by mass.

The polymer (B) may contain a repeating unit of non-fluorinated olefins such as unsaturated carboxylic acids, hydroxy group-containing alkyl vinyl ethers, carboxylic acid vinyl esters, α-olefins, aromatic vinyl monomers, and epoxy group-containing monomers.

Specific examples of the unsaturated carboxylic acids include vinyl acetic acid, crotonic acid, cinnamic acid, 3-allyloxypropionic acid, 3-(2-allyloxyethoxycarbonyl)propionic acid, itaconic acid, itaconic acid monoester, maleic acid, maleic acid monoester, maleic anhydride, fumaric acid, fumaric acid monoester, vinyl phthalate, vinyl pyromellitate, and undecylenic acid. In terms of the controllability of introduction of a carboxyl group and the low likelihood of formation of a homopolymer due to the low homopolymerizability, at least one selected from the group consisting of vinyl acetic acid, crotonic acid, itaconic acid, maleic acid, maleic acid monoester, fumaric acid, fumaric acid monoester, 3-allyloxypropionic acid, and undecylenic acid is preferred.

Specific examples of the hydroxyl group-containing alkyl vinyl ethers include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether. In terms of the excellent polymerization reactivity, at least one selected from the group consisting of 4-hydroxybutyl vinyl ether and 2-hydroxyethyl vinyl ether is preferred.

Specific examples of the carboxylic acid vinyl esters include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butyl benzoate. Use of carboxylic acid vinyl esters provides properties such as improved gloss and an increased glass transition temperature to the coating film resulting from the aqueous dispersion of the present invention.

Specific examples of the α-olefins include ethylene, propylene, n-butene, isobutene, and styrene. Use of α-olefins can provide properties such as improved flexibility to the coating film resulting from the aqueous dispersion of the present invention.

Specific examples of the aromatic vinyl monomers include styrenes such as styrene and α-methyl styrene. Specific examples of the epoxy group-containing monomers include allyl glycidyl ethers.

The mass ratio (A)/(B) of the polymer (A) to the polymer (B) in the fluorine-containing composite polymer particles is preferably 10/90 to 90/10, and more preferably 10/90 to 70/30. Too large an amount of the polymer (A) may deteriorate the film formability and the adhesion to a substrate in coating. The ratio (A)/(B) is more preferably 20/80 to 60/40.

The aqueous dispersion of the present invention preferably further contains an inorganic silicon compound. Use of an inorganic silicon compound enables formation of a coating film having even better adhesion and even better water resistance.

The inorganic silicon compound is preferably silica, and more preferably a silica sol (colloidal silica solution) obtainable by dispersing and stabilizing silica in a solvent.

Silica has a hydrophilic group such as —SiOH or —SiOR (wherein R is Cl or higher alkyl group) on the particle surface.

Examples of the R include a methyl group, an ethyl group, a propyl group, and a butyl group. The upper limit of the number of carbon atoms should be about 6 in terms of expression of the hydrophilicity, and the R is particularly preferably a methyl group or an ethyl group.

The average particle size of the silica is preferably 10 to 200 nm in terms of favorable dispersion stability in an aqueous dispersion, and more preferably 10 to 100 nm in terms of producing a coating film having excellent smoothness and excellent gloss.

The specific gravity of silica is preferably 0.90 to 1.5 g/cm$^3$ in terms of favorable dispersion stability in an aqueous dispersion.

The solvent is not particularly limited if it can disperse silica to form a sol, and examples thereof include ketones such as methyl isobutyl ketone (MIBK) and methyl ethyl ketone (MEK), esters such as ethyl acetate and butyl acetate, aromatics such as toluene and xylene, alcohols such as ethylene glycol, isopropanol, ethanol, and methanol, monoethers such as methyl cellosolve and methyl carbitol, and water.

Ketones, esters, and water are preferred because they have excellent affinity with fluorine-containing composite polymer particles and excellent stability when the mixing is performed.

The silica sol can be produced by mixing the above silica and a solvent by a common method.

The viscosity of the silica sol should be 1 to 200 mPa/s in terms of the workability including easiness in weighing and in handling, and is preferably 1 to 50 mPa/s in terms of dispersibility after mixed into the aqueous dispersion.

Commercially available examples of the silica sol suitably usable in the present invention include solvent silica sols such as MIBK-ST, XBA-ST, NPC-ST, EG-ST-ZL, IPA-ST, MEK-ST, EG-ST-ZL, and EG-ST, and water silica sols such as SNOWTEX ST-20, ST-30, ST-40, ST-C, ST-N, ST-O, ST-S, ST-50, ST-20L, ST-XS, ST-XL, ST-YL, ST-ZL, QAS-40, LSS-35, LSS-45, ST-UP, ST-OUP and ST-AK, all produced by Nissan Chemical Industries, Ltd.

The amount of the inorganic silicon compound is preferably 0.1 to 300 parts by mass, and more preferably 10 to 100 parts by mass, for each 100 parts by mass of the fluorine-containing composite polymer particles. Too small an amount of the inorganic silicon compound may not be able to form a coating film having excellent adhesion, while too large an amount of the inorganic silicon compound may result in inferior transparency of the aqueous dispersion. In the case of using a silica sol, the solids content of the silica sol is preferably 0.1 to 300 parts by mass, and more preferably 10 to 100 parts by mass, for each 100 parts by mass of the fluorine-containing composite polymer particles.

The aqueous dispersion of the present invention preferably contains 20 to 65% by mass, more preferably 30 to 60% by mass, and still more preferably 35 to 50% by mass, of the fluorine-containing composite polymer particles.

The aqueous dispersion of the present invention preferably contains an aqueous medium. The aqueous medium may be water alone, or may be an aqueous mixture solvent obtained from water and a water-soluble compound such as an alcohol.

The fluorine-containing composite polymer particles preferably have an average particle size of 50 to 300 nm, and more preferably 50 to 250 nm. Too small a particle size may result in too high viscosity of the aqueous dispersion which has inferior handleability. Too large a particle size may reduce the precipitation stability of the aqueous dispersion, or may increase the minimum film-forming temperature.

Another aspect of the present invention is an aqueous coating composition containing the above aqueous dispersion. The aqueous coating composition of the present invention contains the above aqueous dispersion, and may employ known additives and blending ratios. The concentration of the fluorine-containing composite polymer particles is preferably 10 to 65% by mass, more preferably 30 to 60% by mass, and still more preferably 35 to 50% by mass.

In the case of preparing an aqueous coating composition containing a pigment, the above aqueous dispersion may be mixed with stirring, in advance, with a predetermined amount of a pigment dispersion in which water, a pigment such as titanium oxide, and components such as an anti-foaming agent, a pigment dispersant, and a pH adjustor are dispersed by a pigment dispersing device such as a sand mill, and with a predetermined amount of a film-forming aid; the mixture is mixed with a predetermined amount of a thickener; and other necessary additives are appropriately added. In the case of preparing an aqueous coating composition without a pigment, the above aqueous dispersion may be mixed with water, a film-forming aid, an anti-foaming agent, a thickener, a pH adjustor, and other necessary additives by a known method as needed with stirring.

The additives for coating materials to be added as needed may be, for example, a film-forming aid, an antifreezing agent, a pigment, a filler, a pigment dispersant, a defoaming agent, a leveling agent, a rheology modifier, an antiseptic, an ultraviolet absorber, an antioxidant, a delustering agent, a lubricant, and a vulcanizing agent.

The substrate to which the aqueous coating composition of the present invention is to be applied is not particularly limited. The substrate may be, for example, a metal substrate such as a hot dipped steel plate, a stainless steel plate, or an aluminum steel plate; a ceramic substrate such as a slate, a ceramic sizing material, a foamed concrete, or glass; or a plastic substrate such as a vinyl chloride sheet, a PET film, a polycarbonate, or an acrylic film. The hot dipped steel plate may be, for example, a hot-dip zinc coated steel sheet, a hot-dip zinc-aluminum-magnesium alloy coated steel sheet, a hot-dip aluminum-zinc coated steel sheet, or a hot-dip aluminum-coated steel sheet.

The method for coating various substrates with the aqueous coating composition of the present invention may be a known method performed under known conditions. For example, a coating method such as spray coating, roll coating, flow coating, or a coating method using a roller or a brush can be performed on a substrate.

The drying method after the coating is not particularly limited, and may be air drying at ambient air temperature or low-temperature (5° C. to 60° C.) drying performed by taking drying time. The coating composition of the present invention can be formed into a coating film having excellent weather resistance, water resistance, strength, substrate adhesion, and film-formability by forced drying at temperatures from normal temperature to 200° C., particularly 60° C. to 200° C. (substrate temperature). The time required for the forced drying is typically three seconds to ten minutes.

Examples of the coating composition include weather resistant coating compositions, particularly weather resistant coating compositions for architectures and buildings, coating compositions for vehicle interiors and exteriors, coating compositions for electric product interiors and exteriors, and coating compositions for office machines or kitchen tools. Particularly in terms of favorable weather resistance and durability, the coating composition can be advantageously used as a weather resistant coating composition for buildings.

Yet another aspect of the present invention is a method for producing the above aqueous dispersion. The production method of the present invention includes the steps of: adding an acrylic monomer and a polymerization initiator to an aqueous dispersion that contains particles of a polymer (A) with a repeating unit of vinylidene fluoride; and polymerizing the acrylic monomer to produce an aqueous dispersion containing fluorine-containing composite polymer particles of the polymer (A) with a repeating unit of vinylidene fluoride and a polymer (B) with a repeating unit of the acrylic monomer.

The production method of the present invention is seed polymerization in which acrylic monomers are emulsion-polymerized in water with particles of the polymer (A) as seed particles. The aqueous dispersion containing particles of the polymer (A) may contain components such as water and an emulsifier as well as the polymer (A). The solids concentration of the polymer (A) in the aqueous dispersion may be 20 to 70% by mass.

The acrylic monomers and a polymerization initiator may be added while the acrylic monomers are polymerized.

The total amount of the acrylic monomer is preferably 40 to 400 parts by mass, and more preferably 45 to 300 parts by mass, for each 100 parts by mass of the particles of the polymer (A).

The acid value of the resulting aqueous dispersion can be adjusted by controlling the amount of the acrylic monomers, particularly by controlling the amount of acrylic acid.

The polymerization initiator is not particularly limited if it can contribute to the free radical reaction in water, and may be used in combination with a reducing agent. Examples of a water-soluble, usable polymerization initiator include persulfate and hydrogen peroxide, and examples of the reducing agent include sodium metabisulfite, sodium bisulfite, sodium L-ascorbate, and rongalite. Examples of an oil-soluble polymerization initiator include diisopropyl peroxy dicarbonate (IPP), benzoyl peroxide, dibutyl peroxide, and azobisisobutyronitrile (AIBN). The amount of the polymerization initiator is preferably 0.05 to 2.0 parts by mass for each 100 parts by rass of acrylic monomers.

In addition to the acrylic monomers and polymerization initiator, additives such as an emulsifier, a chain transfer agent, a chelating agent, and a pH adjuster may be added.

The emulsifier may be a reactive emulsifier, a non-reactive emulsifier, or a combination of these. Examples of the non-reactive emulsifier include known anionic emulsifiers and nonionic emulsifiers used alone or in combination. An amphoteric emulsifier can also be used depending on the case.

Examples of a chain transfer agent include halogenated hydrocarbons such as chloroform and carbon tetrachloride; and mercaptans such as n-dodecyl mercaptan, tert-dodecyl mercaptan, and n-octyl mercaptan. The amount of the chain transfer agent is preferably 0 to 5.0 parts by mass for each 100 parts by mass of the acrylic monomers.

The polymerization temperature for the acrylic monomers may be 10° C. to 90° C., and the polymerization time may be 0.5 to 6 hours.

EXAMPLES

In the following, the present invention is described based on examples. The present invention is not limited to the examples.

The numerical values in the examples were measured by the following methods.

(Acid Value)

The acid value was calculated from the following formula.

"Acid value"=(number of moles of acid monomer× molecular weight (g/mol) of KOH×1000)/(total amount (g) of acrylic monomer charged+ amount (g) of fluoropolymer charged)

(Number of Moles of Acid Monomer)

The number of moles of an acid monomer was calculated from the following formula.

"Number of moles of acid monomer"=amount (g) of acid monomer charged/molecular weight (g/mol) of acid monomer (Concentration of Fluorine-containing Composite Polymer Particles)

The concentrations of the aqueous dispersions of the fluorine-containing composite polymer particles obtained in the examples and comparative examples each are expressed in percentage of the mass of the heating residue per mass (1 g) of an aqueous dispersion after drying of the aqueous dispersion (1 g) at 150° C. for 60 minutes in a ventilation dryer.

(Average Particle Size)

The average particle size was measured using a laser light scattering particle size analyzer (product of Otsuka Electronics Co., Ltd., trade name: ELS-3000).

(Preparation of Aqueous Coating Composition)

Each of the aqueous dispersions of fluorine-containing composite polymer particles obtained in the examples and comparative examples was neutralized to a pH of 7.5 with triethyl amine. To the aqueous dispersion was added a film-forming aid (diethyl adipate) in an amount of 5% by mass in solids content, and the mixture was stirred for 30 minutes by a three-one motor, whereby an aqueous coating composition for clear coating materials was prepared.

(One-coat Coating and Production of Specimen)

The obtained aqueous coating composition was applied to a galvalume steel sheet (product of Nippon Testpanel Co., Ltd.) by a bar coater, and dried at 140° C. for 7 seconds to produce a clear coating film having a thickness of 4 μm.

(Appearance)
(Evaluation Criteria)

The produced specimen is visually determined whether or not it has aggregates, bulges, cracks, or the like defects. A specimen with no defects such as bulges and cracks is evaluated as "good". A specimen with 1 to 5 defects such as bulges or cracks is evaluated as "moderate". A specimen with more than 5 defects such as bulges or cracks is evaluated as "bad".

(Initial Adhesion)

The coating film is dried, left to stand for 24 hours, and subjected to the cross-cut tape peel test in accordance with JIS D0202-1988. The specimen is pressed onto a film with the finger pad, with cellophane tape ("CT24", product of Nichiban Co., Ltd.) between them, and they are separated. The adhesion is determined from the number of squares which are not removed, out of 25 squares.

(Weather Resistance)
(Test Method)

The produced specimen is put into an accelerated weather meter, and 322 hours later, the infrared spectroscopy spectrum is measured by the ATR (attenuated total reflection spectroscopy) method. The weather resistance is evaluated from the attenuation factor of absorption of the C—H stretching vibrations (near 1700 cm$^{-1}$) of acrylates.

Accelerated weather meter (SUV): Super UV Tester, product of IWASAKI ELECTRIC CO., LTD.

Test cycle: pure water spray (every 10 seconds) for 1 hour→exposure for 11 hours (black panel temperature: 63° C., relative humidity: 70%)→dew condensation for 11 hours (black panel temperature: 30° C., relative humidity: 100%). This cycle is taken as one cycle (23 hours).

Test time: 322 hours (14 cycles)

(Evaluation Criteria)

The infrared spectroscopy spectrum of the surface of the specimen after the test is performed by the ATR (attenuated total reflection spectroscopy) method. The states of the specimen before and after (322 hours later) the accelerated weather resistance test are compared. The absorption of the C—F stretching vibrations near 1150 cm$^{-1}$ is standardized, and whether the absorption of the C—H stretching vibrations of acrylates near 1700 cm$^{-1}$ is attenuated after the test is determined. A specimen is evaluated as "good" if the attenuation of the absorption of the C—H stretching vibrations of acrylates near 1700 cm$^{-1}$ is 10% or lower compared to the absorption before the test. A specimen is evaluated as "moderate" if the attenuation is higher than 10% and not higher than 25%. A specimen is evaluated as "bad" if the attenuation is higher than 25%. ATR measurement: measured using FT-IR Spectrometer Spectrum 100 produced by Perkin Elmer (Top Clear Coating and Production of Specimen)

The obtained aqueous coating composition was applied, using a bar coater, to a galvalume steel sheet (product of Nippon Testpanel Co., Ltd.) which had been subjected to undercoating (using a product of DAIKIN INDUSTRIES, LTD.; ZEFFLE weather resistant undercoat) and intermediate coating (using a product of DAIKIN INDUSTRIES, LTD.; ZEFFLE weather resistance undercoat). The coating composition was dried for one day, so that a specimen having a clear coating film with a thickness of 10 μm was produced.

(Initial Adhesion)

The coating film is subjected to the cross-cut tape peel test in accordance with JIS D0202-1988. The specimen is pressed onto a film with the finger pad, with cellophane tape ("CT24", product of Nichiban Co., Ltd.) between them, and they are separated. The adhesion is determined from the number of squares which are not removed, out of 25 squares.

(Initial Water Resistance)

The obtained specimen is immersed in water at 23° C. for one day. The levels of bulges (JIS K5600-8-2), cracks (JIS K5600-8-4), and peels (JIS K5600-8-5) of the specimen are evaluated right after being taken out of water.

(Secondary Adhesion)

The specimen taken out of water is then dried at 23° C. for one day, and subjected to the cross-cut tape peel test in accordance with JIS D0202-1988. The specimen is pressed onto a film with the finger pad, with cellophane tape ("CT24", product of Nichiban Co., Ltd.) between them, and they are separated. The adhesion is determined from the number of squares which are not removed, out of 25 squares.

(Bulges)

Evaluation criteria for level of bulges (JIS K5600-8-2)

The densities are divided into the levels of 0 to 5 (0 indicates smaller values), and the sizes are divided into the levels of S1 to S5 (S1 indicates smaller values). The level is expressed as, for example, 2(S1).

(Cracks)

Evaluation Criteria for Level of Cracks (JIS K5600-8-4)

The densities are divided into the levels of 0 to 5 (0 indicates smaller values), the sizes are divided into the levels of S0 to S5 (S0 indicates smaller values), and the depths are divided into the levels of a to c (a indicates shallower cracks). The level is expressed as, for example, 2(S1)b.

(Peels)

Evaluation Criteria for Level of Peels (JIS K5600-8-5)

The densities are divided into the levels of 0 to 5 (0 indicates smaller values), the sizes are divided into the levels of S1 to S5 (S1 indicates smaller values), and the depths are divided into the levels of a and b (a indicates shallower peels). The level is expressed as, for example, 2(S1)a.

(Weather Resistance)

The produced specimen is put into an accelerated weather meter, and the gloss value, L value, a value, and b value are measured at a certain cycle. The gloss retention (%) is calculated from the results, and the weather resistance of the coating film is evaluated.

Accelerated weather meter (SUV): Super UV tester, product of IWASAKI ELECTRIC CO., LTD.

Test cycle: pure water spray (every 10 seconds) for 1 hour→exposure for 11 hours (black panel temperature: 63° C., relative humidity: 70%)→dew condensation for 11 hours (black panel temperature: 30° C., relative humidity: 100%). This cycle is taken as one cycle (23 hours).

Test time: 966 hours (42 cycles) to 1610 hours (70 cycles)

Example 1

Production of Aqueous Dispersion of VDF Polymer (A)

A 2.0-L glass separable flask was charged with 571.4 g of an aqueous dispersion (solids concentration: 45.5% by mass) of particles of a VDF/TFE/CTFE copolymer (=72.1/14.9/13 (mol %)) (VTC) as VDF polymer particles. To the mixture were added 37.1 g of Newcol707SF (product of Nippon Nyukazai Co., Ltd.) as an emulsifier and 59.3 g of water. The materials were sufficiently mixed to give an aqueous dispersion.

A 1.0-L glass flask was charged with 208.1 g (80.0% by mass) of methyl methacrylate (MMA), 44.9 g (17.3% by mass) of n-butyl acrylate (n-BA), and 7.0 g (2.7% by mass) of acrylic acid (AA), so that a monomer solution was prepared.

The internal temperature of the separable flask was increased to 80° C., and the whole amount of the monomer solution was added to the above aqueous dispersion of VDF/TFE/CTFE copolymer particles over 3 hours. The polymerization was progressed by adding 41.1 g of ammonium persulfate (APS) (1% by mass aqueous solution) every 30 minutes in 7 aliquots while dropping the monomer solution. Five hours after the polymerization initiation, the reaction solution was cooled to room temperature to terminate the reaction, whereby an aqueous dispersion of acryl-fluorine composite polymer particles was obtained (solids concentration: 52.0% by mass). The composition of the acrylic polymer moiety in the obtained acryl-fluorine composite polymer was MMA/n-BA/AA=80.0/17.3/2.7 (% by mass ratio). Also, the mass ratio (fluoropolymer/acrylic polymer) of the VDF polymer moiety and the acrylic polymer moiety in the obtained acryl-fluorine composite polymer particles was 50/50.

Examples 2 to 4

Acryl-fluorine composite polymers in these examples each were obtained by seed polymerization performed in the same manner as in Example 1, except that the monomer mixture in Table 1 was used as the acrylic monomer mixture for acrylic polymers.

Example 5

An acryl-fluorine composite polymer was obtained by seed polymerization performed in the same manner as in Example 1, except that an aqueous dispersion (solids concentration: 10.0% by mass) of VDF/TFE copolymer (=80/20 (mol %)) (VT) particles as the VDF polymer particles was used.

Example 6

An acryl-fluorine composite polymer was obtained by seed polymerization performed in the same manner as in Example 1, except that an aqueous dispersion (solids concentration: 10.0% by mass) of VDF/HFP copolymer (=91/9 (mol %)) (VH) particles as the VDF polymer particles was used.

Example 7

An acryl-fluorine composite polymer was obtained by seed polymerization performed in the same manner as in Example 1, except that the monomer mixture shown in Table 1 was used as the acrylic monomer mixture for acrylic polymers and SNOWTEX ST-30 (trade name, product of Nissan Chemical Industries, Ltd.) was used as the inorganic silicon compound.

Comparative Example 1

An acryl-fluorine composite polymer for comparison was obtained by seed polymerization performed in the same manner as in Example 1, except that a monomer mixture of MMA/n-BA/AA=82.4/17.0/0.6 (% by mass ratio) for comparison was used as the acrylic monomer mixture for acrylic polymers. The composition of the acrylic polymer moiety in the obtained acryl-fluorine composite polymer was MMA/n-BA/AA=82.4/17.0/0.6 (% by mass ratio). Also, the mass ratio (fluoropolymer/acrylic polymer) of the VDF polymer moiety and the acrylic polymer moiety in the obtained acryl-fluorine composite polymer particles was 50/50.

Comparative Example 2

An acryl-fluorine composite polymer was obtained by seed polymerization performed in the same manner as in Comparative Example 1, except that the monomer mixture shown in Table 1 was used as the acrylic monomer mixture for acrylic polymers.

TABLE 1

|  | Example 1 | Example 2 | Example 3 | Example 4 | Example 5 | Example 6 | Example 7 | Comp. 1 | Comp. 2 |
|---|---|---|---|---|---|---|---|---|---|
| Acryl-fluorine composite polymer | | | | | | | | | |
| VDF polymer | VTC | VTC | VTC | VTC | VT (80/20 mol %) | VH (91/9 mol %) | VTC | VTC | VTC |
| Acrylic polymer | | | | | | | | | |
| MMA (% by mass) | 80 | 77.9 | 80.1 | 77.3 | 80 | 80 | 80.1 | 82.4 | 98.0 |
| n-BA (% by mass) | 17.3 | 18.7 | 18.9 | 18.9 | 17.3 | 17.3 | 18.9 | 17.0 | 1.0 |
| AA (% by mass) | 2.7 | 2.4 | 1.0 | 3.8 | 2.7 | 2.7 | 1.0 | 0.8 | 1.0 |
| Fluoropolymer/acrylic polymer (mass ratio) | 50/50 | 50/50 | 50/50 | 50/50 | 50/50 | 50/50 | 50/50 | 50/50 | 70/30 |
| Acid value (mgKOH/g) | 11 | 9 | 4 | 15 | 11 | 11 | 4 | 2 | 2 |
| Acryl-fluorine composite polymer/inorganic silicon compound (mass ratio) | — | — | — | — | — | — | 100/50 | — | — |
| inorganic silicon compound | — | — | — | — | — | — | SNOWTEX ST-30 | — | — |
| Coating film properties | | | | | | | | | |
| One coating | | | | | | | | | |
| Initial adhesion | 25/25 | 25/25 | 18/25 | 25/25 | 25/25 | 25/25 | 20/25 | 0/25 | 0/25 |
| Appearance | Good | Good | Good | Good | Good | Good | Good | Good | Good |
| Weather resistance | Good | Good | Good | Good | Good | Good | Good | Good | Good |
| Top coating | | | | | | | | | |
| Initial adhesion | 5/25 | 5/25 | 2/25 | 10/25 | 5/25 | 5/25 | — | 0/25 | 0/25 |

TABLE 1-continued

| | Example | | | | | | | Comparative Example | |
|---|---|---|---|---|---|---|---|---|---|
| | 1 | 2 | 3 | 4 | 5 | 6 | 7 | 1 | 2 |
| Initial water resistance | | | | | | | | | |
| Bulges | 5(S1) | 5(S1) | 5(S1) | 5(S1) | 5(S1) | 5(S1) | — | 5(S1) | 5(S1) |
| Cracks | None | None | None | None | None | None | — | None | None |
| Peels | None | None | None | None | None | None | — | None | None |
| Secondary adhesion | 5/25 | 5/25 | 2/25 | 10/25 | 5/25 | 5/25 | — | 0/25 | 0/25 |
| Weather resistance (SUV) | | | | | | | | | |
| Gloss retention (%) | 98 | 97 | 97 | 96 | 98 | 97 | — | 97 | 98 |

Table 1 shows that an aqueous dispersion containing fluorine-containing composite polymer particles of the polymer (A) and the polymer (B) and having an acid value of at least 3 mgKOH/g can form a coating film with excellent adhesion to a substrate, excellent water resistance, and excellent weather resistance.

The invention claimed is:

1. An aqueous dispersion comprising
fluorine-containing composite polymer particles of a polymer (A) with a repeating unit of vinylidene fluoride and a polymer (B) with a repeating unit of at least one acrylic monomer selected from the group consisting of acrylic acid, acrylic acid esters, methacrylic acid, and methacrylic acid esters,
the dispersion having an acid value of 12-18 mgKOH/g,
wherein the mass ratio (A)/(B) of the polymer (A) to the polymer (B) in the fluorine-containing composite polymer particles is 20/80 to 60/40.

2. The aqueous dispersion according to claim 1,
wherein the polymer (B) contains a repeating unit of a methacrylic acid ester and a repeating unit of at least one acrylic monomer selected from the group consisting of acrylic acid and acrylic acid esters.

3. The aqueous dispersion according to claim 1,
wherein the polymer (A) further contains a repeating unit of at least one fluoroolefin selected from the group consisting of tetrafluoroethylene units, hexafluoropropylene units, and chlorotrifluoroethylene units.

4. The aqueous dispersion according to claim 1,
wherein the dispersion comprises the fluorine-containing composite polymer particles in an amount of 20 to 65% by mass.

5. The aqueous dispersion according to claim 1,
wherein the fluorine-containing composite polymer particles have an average particle size of 50 to 300 nm.

6. The aqueous dispersion according to claim 1, further comprising
an inorganic silicon compound.

7. An aqueous coating composition comprising
the aqueous dispersion according to claim 1.

8. A method for producing the aqueous dispersion according to claim 1, the method comprising the steps of:
adding an acrylic monomer and a polymerization initiator to an aqueous dispersion that contains particles of a polymer (A) with a repeating unit of vinylidene fluoride; and
polymerizing the acrylic monomer to produce an aqueous dispersion containing fluorine-containing composite polymer particles of the polymer (A) with a repeating unit of vinylidene fluoride and a polymer (B) with a repeating unit of the acrylic monomer.

* * * * *